US009549248B2

(12) United States Patent
Holzmann

(10) Patent No.: US 9,549,248 B2
(45) Date of Patent: Jan. 17, 2017

(54) METHOD AND APPARATUS FOR REDUCING CROSSTALK IN AN INTEGRATED HEADSET

(71) Applicant: Nuvoton Technology Corporation, Hsinchu (CN)

(72) Inventor: Peter J. Holzmann, San Jose, CA (US)

(73) Assignee: NUVOTON TECHNOLOGY CORPORATION, Hsin-Chu (TW)

( * ) Notice: Subject to any disclaimer, the term of this patent is extended or adjusted under 35 U.S.C. 154(b) by 310 days.

(21) Appl. No.: 14/017,980

(22) Filed: Sep. 4, 2013

(65) Prior Publication Data

US 2015/0063585 A1 Mar. 5, 2015

(51) Int. Cl.

| | |
|---|---|
| ***H04B 15/00*** | (2006.01) |
| ***H04R 3/00*** | (2006.01) |
| ***H04R 3/14*** | (2006.01) |
| *H04R 1/10* | (2006.01) |

(52) U.S. Cl.

CPC *H04R 3/00* (2013.01); *H04R 3/14* (2013.01); *H04R 1/1041* (2013.01)

(58) Field of Classification Search

None

See application file for complete search history.

(56) References Cited

U.S. PATENT DOCUMENTS 6,668,061 B1 * 12/2003 Abel ........................ H04S 1/002 381/1
2008/0008325 A1 * 1/2008 Holmstrom ............... H04S 1/00 381/11
2013/0156238 A1 * 6/2013 Birch ................... G10K 11/178 381/309

* cited by examiner

*Primary Examiner* — Joseph Saunders, Jr.
*Assistant Examiner* — James Mooney
(74) *Attorney, Agent, or Firm* — Kilpatrick Townsend & Stockton LLP

(57) ABSTRACT

An audio system has a first channel for receiving a first input signal and driving a first speaker and a second channel for receiving a second input signal and driving a second speaker. A first feedforward circuit couples an input of the second channel circuit to an input of the first channel circuit. A second feedforward circuit couples an input of the first channel circuit to an input of the second channel circuit. Circuit parameters of the first and the second feedforward circuits are determined such that a first detected output signal is zero when the first input signal is non-zero and the second input signal is zero, and a second detected output signal is zero when the second input signal is non-zero and the first input signal is zero. The audio system is configured to operate using the determined circuit parameters for the first and the second feedforward circuits.

17 Claims, 8 Drawing Sheets

METHOD AND APPARATUS FOR REDUCING CROSSTALK IN AN INTEGRATED HEADSET

BACKGROUND OF THE INVENTION

The present invention relates generally to electronic circuits for audio systems. More particularly, embodiments of the present invention provide circuits and systems for reducing crosstalk in a headset for audio applications.

With the advancement of electronics and integrated circuits, great progress has also been made in audio systems used in entertainment, computer systems, communication, electronic games, and mobile computing devices, etc. In advanced audio systems with features such as stereo sound, 3-D sound, and noise cancellation, the demand for quality is even higher. The quality of an audio system is measured by many parameters, for example, frequency response, harmonic distortion, output power, noise, and crosstalk, etc.

In electronics, crosstalk occurs when a signal transmitted on one circuit or channel of a system creates an undesired effect in another circuit or channel. Crosstalk is usually caused by undesired coupling from one circuit to another. Crosstalk can be especially prevalent in audio systems that include multiple speakers. For example, headphones are a pair of small loudspeakers that are designed to be held close to a user's ears. Headphones either have wires or have a wireless receiver for connection to a signal source such as an audio amplifier, radio, CD player, portable media player, or mobile phone. Modern headphones have been particularly widely sold and used for listening to stereo recordings. Headphones are also useful for video games that use 3D positional audio processing algorithms, as they allow players to better judge the position of an off-screen sound source.

Multiple speakers are also used in surround sound, which is a technique for enriching the sound reproduction quality of an audio source with additional audio channels from speakers that surround the listener. Typically this is achieved by using multiple discrete audio channels routed to an array of loudspeakers.

As described below, an audio system having two or more speakers often are susceptible to crosstalk noise. Therefore, improved techniques for reducing the crosstalk noise in an audio system are highly desired.

BRIEF SUMMARY OF THE INVENTION

The present invention relates generally to electronic circuits for audio systems. More particularly, embodiments of the present invention relate to circuits and systems for reducing crosstalk in an audio system having two speakers. Merely, by way of example, embodiments of the present invention have been applied to a headset having two speakers sharing a ground connection, but it would be recognized that the invention has a much broader range of applications and can be applied to other audio systems as well.

According to an embodiment of the present invention, an integrated audio signal processing circuit is described for reducing crosstalk noise in an audio system having a first channel circuit for receiving a first input signal and driving the first speaker and a second channel circuit for receiving a second input signal and driving the second speaker. A first feedforward circuit couples an input of the second channel circuit to an input of the first channel circuit. A second feedforward circuit couples an input of the first channel circuit to an input of the second channel circuit. Circuit parameters of the first feedforward circuit are determined from measurement of crosstalk caused by the second channel output to the first channel output. Circuit parameters of the second feedforward circuit are determined from measurement of crosstalk caused by the first channel output to the second channel output. In a specific embodiment, the circuit parameters are chosen such that a first detected output signal is zero when the first input signal is non-zero and the second input signal is zero, and such that a second detected output signal is zero when the second input signal is non-zero and the first input signal is zero. The audio system is configured to operate using the determined circuit parameters for the first and the second feedforward circuits.

According to another embodiment of the invention, an audio system is provided. The audio system includes a first speaker and a second speaker, wherein the first and the second speakers share a common ground terminal. The audio system also includes an integrated audio signal processing circuit for driving the first speaker and the second speaker. An example of the integrated audio signal processing circuit is described above, and further details are provided below.

According to another embodiment of the invention, a methods is provided for reducing crosstalk noise in an audio system having a first channel circuit for receiving a first input signal and driving a first speaker and a second channel circuit for receiving a second input signal and driving a second speaker. The method includes providing a first feedforward circuit coupling an input of the second channel circuit to an input of the first channel circuit. The method also includes providing a second feedforward circuit coupling an input of the first channel circuit to an input of the second channel circuit. The method also includes determining circuit parameters of the first feedforward circuit from measurement of crosstalk caused by the second channel output to the first channel output. The method further includes determining circuit parameters of the second feedforward circuit from measurement of crosstalk caused by the first channel output to the second channel output. The method includes operating the audio system using the determined circuit parameters for the first and the second feedforward circuits. In a specific embodiment, the circuit parameters are chosen such that a first detected output signal is zero when the first input signal is non-zero and the second input signal is zero, and such that a second detected output signal is zero when the second input signal is non-zero and the first input signal is zero.

A further understanding of the nature and advantages of the present invention may be realized by reference to the remaining portions of the specification and the drawings.

DETAILED DESCRIPTION OF THE INVENTION

The description below will refer to a series of drawing figures enumerated above. These diagrams are merely examples, and should not unduly limit the scope of the claims herein. In connection with the various aspects illustrated and described, one of ordinary skill in the art would recognize other variations, modifications, and alternatives.

Figure 1:
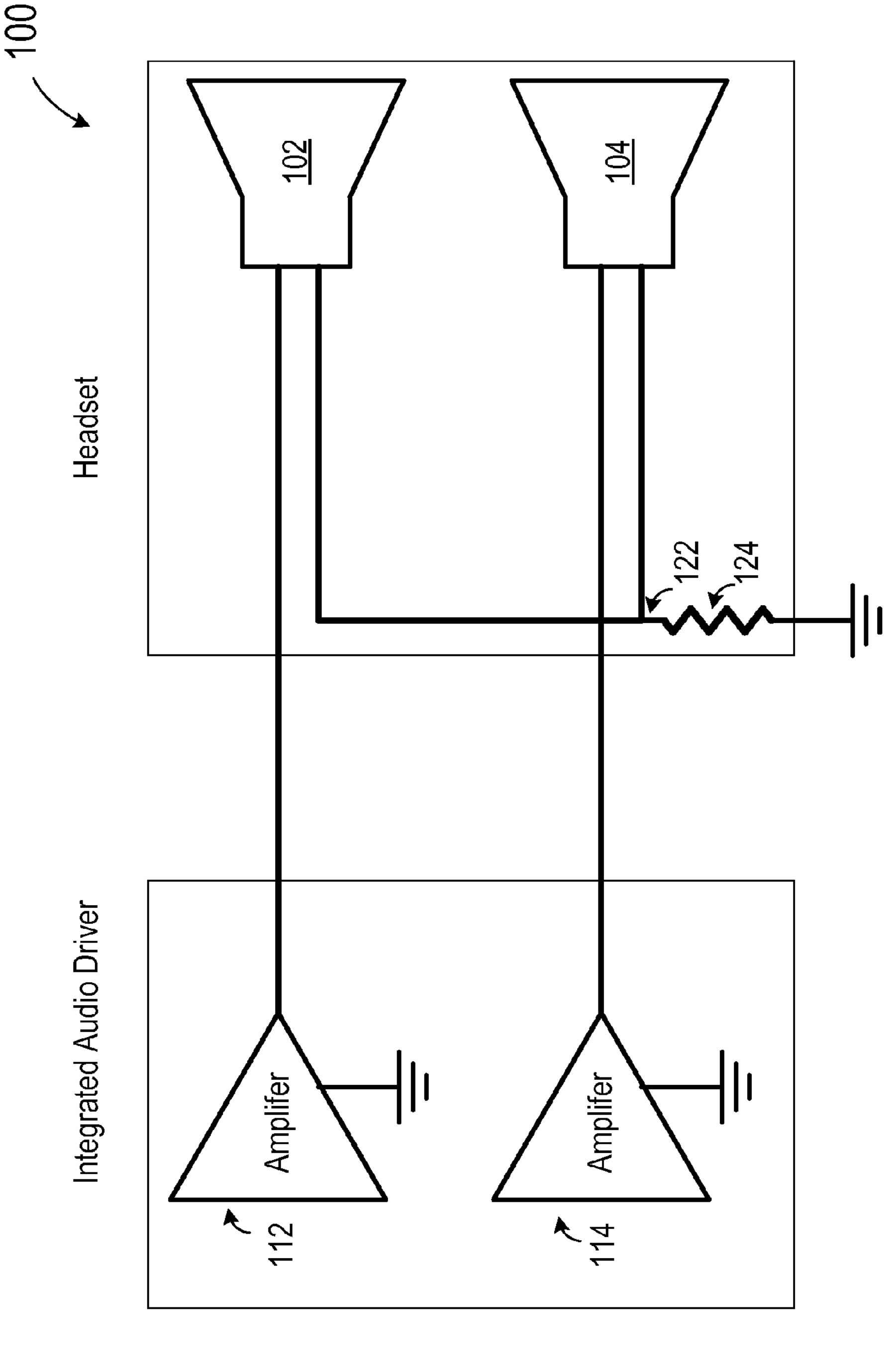
FIG. 1 (Prior Art)
FIG. 1 is a schematic diagram illustrating a conventional audio system including two speakers.

FIG. 1 is a schematic diagram illustrating a conventional audio system including two speakers. As shown, audio system 100 includes two speakers 102 and 104 driven by an audio driver that includes a first amplifier 112 and a second amplifier 114. In some applications, such as in a headset for a mobile device, the two speakers for the earpieces often share a ground connection. A headset is sometimes referred to as a headphone combined with a microphone. However, in this description, headset and headphone are used interchangeably. As shown in FIG. 1, speakers 102 and 104 share a common node 122, which is connected to the ground GND through a resistance 124. Resistance 124 may be a physical resistor in the circuit or a parasitic resistance. This arrangement can be desirable because it can simplify the circuit and reduce pin count and cost. However, it also susceptible to crosstalk noise. For example, electrical signal in the circuit for speaker 102 may cause a voltage built up in resistance 124, and the resulting voltage at node 122 may cause crosstalk noise in speaker 104. Conversely, electrical signal in the circuit of speaker 104 may lead to crosstalk noise in speaker 102. Such crosstalk noise is highly undesirable, especially in systems of 3-D sound or noise cancellation.

Therefore, there is a need for improved method for the reduction of crosstalk noise in an audio system.

Figure 2:
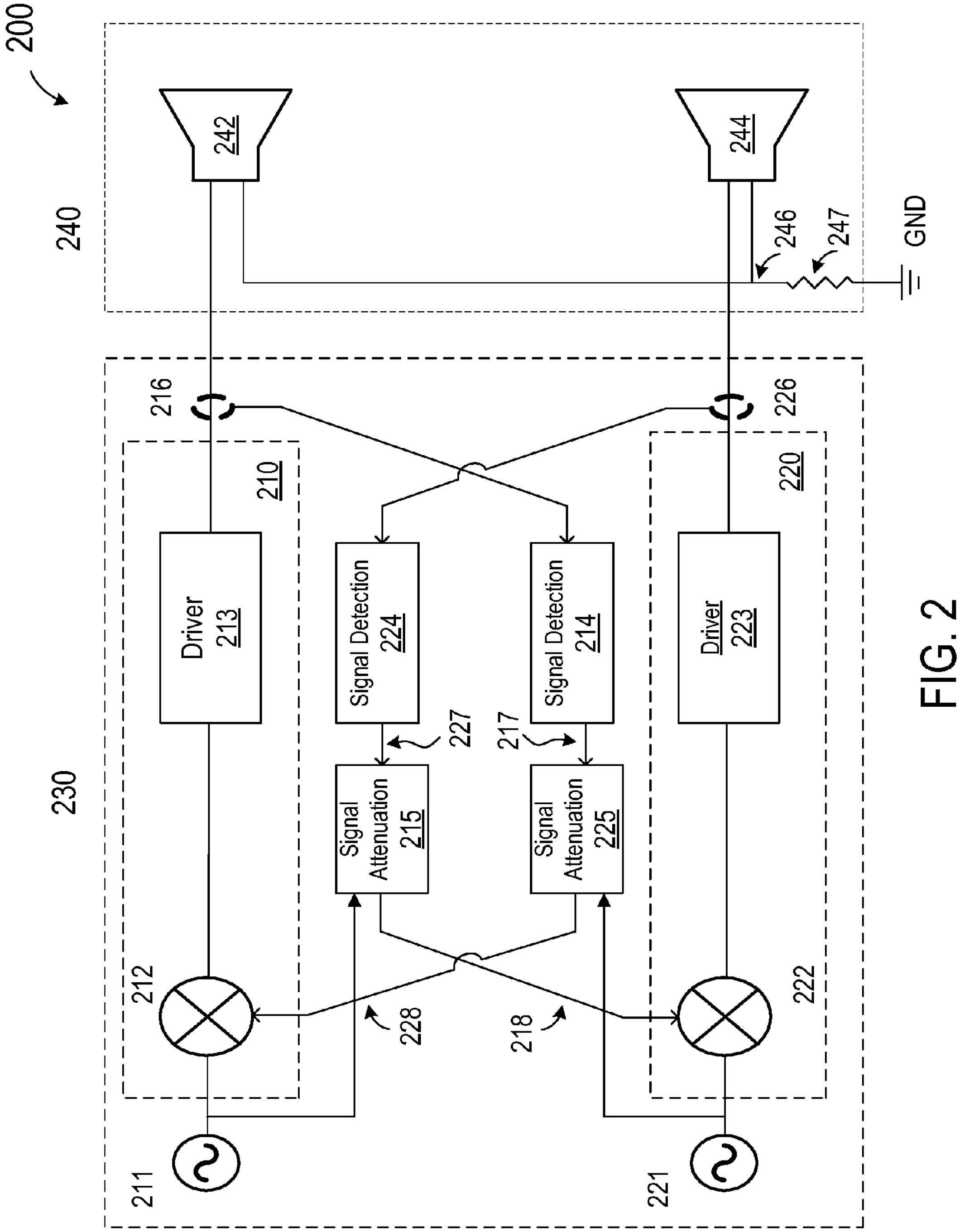
FIG. 2 is a simplified schematic diagram illustrating an integrated audio signal processing circuit according to an embodiment of the present invention.

FIG. 2 is a simplified schematic diagram illustrating an integrated audio signal processing circuit according to an embodiment of the present invention. As shown in FIG. 2, audio signal processing circuit 230 is configured for driving a first speaker 242 and a second speaker 244.

As shown in FIG. 2, the first and the second speakers share a common ground terminal 246, which is coupled to an electrical ground through a resistor 247. Resistor 247 may be a physical resistor element of the circuit or a parasitic resistance. In this embodiment, audio signal processing circuit 230 includes a first channel circuit 210 coupled to first speaker 242 and a second channel circuit 220 coupled to second speaker 244. The first channel circuit 210 is configured for receiving a first input signal 211 and driving the first speaker 242. In a specific embodiment, the first channel circuit 210 includes a first mixer circuit 212 coupled to a first driver circuit 213. Similarly, the second channel circuit 220 is configured for receiving a second input signal 221 and driving the second speaker 244. The second channel circuit 220 includes a second mixer circuit 222 coupled to a second driver circuit 223.

As shown in FIG. 2, audio signal processing circuit 230 also includes a first signal detection circuit 214 and a second signal detection circuit 224. The first signal detection circuit 214 is coupled to an output 216 of the first driver circuit 213 and configured for providing a first detected output signal 217. The second signal detection circuit 224 is coupled to an output 226 of the second driver circuit 223 and configured for detecting providing a second detected output signal 227. Further, audio signal processing circuit 230 also includes a first signal attenuation circuit 215 coupled to first input signal 211 and configured for providing a first correction signal 218 to the second mixer circuit 222 based on the first input signal 211 and the second detected output signal 227 provided by the second signal detection circuit 224. Audio signal processing circuit 230 also includes a second attenuation circuit 225 coupled to the second input signal 221 and configured for providing a second correction signal 228 to the first mixer circuit 212 based on the second input signal 221 and the first detected output signal 217 provided by the first signal detection circuit 214.

Figure 3:
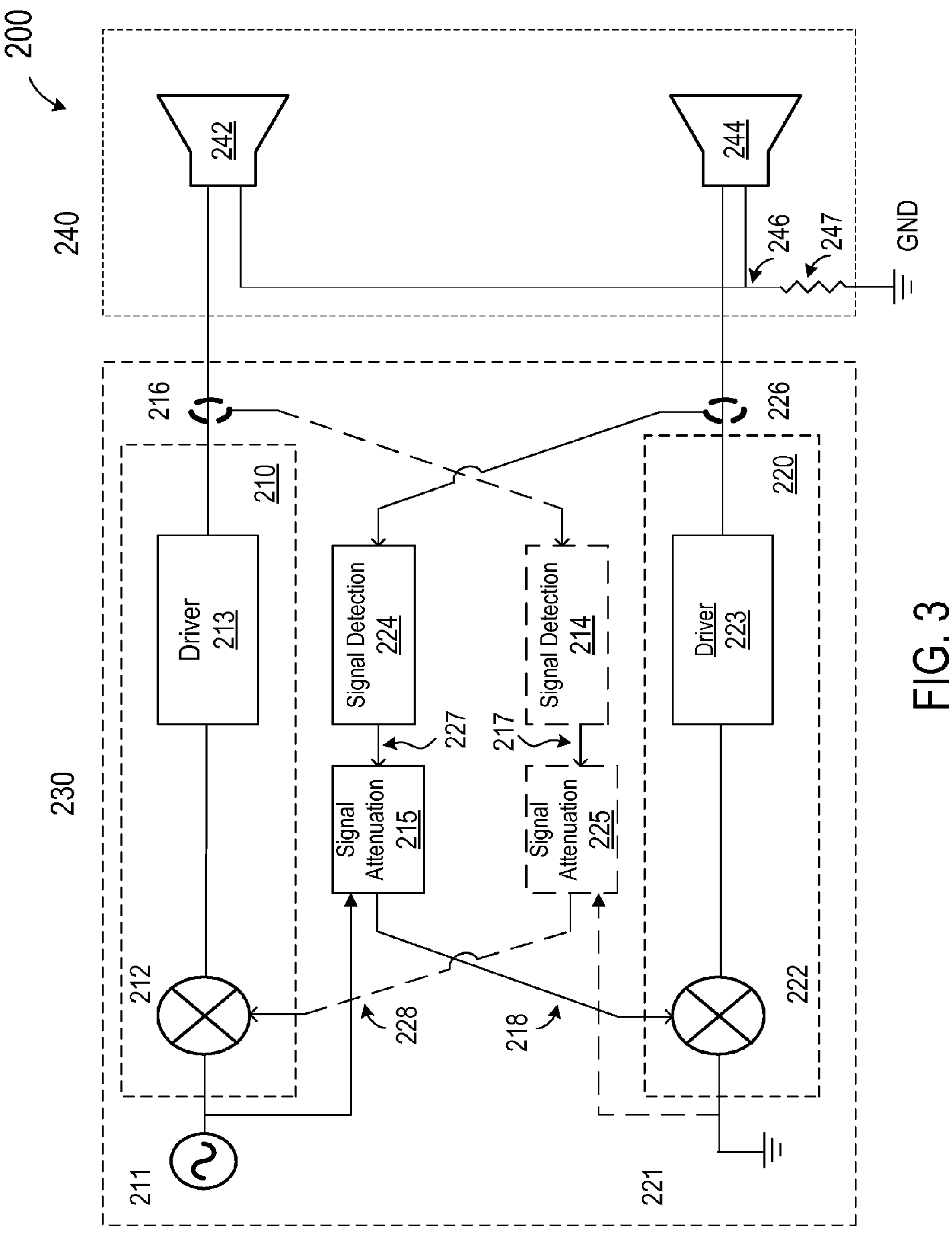
FIGS. 3 and 4 illustrate a method for reducing crosstalk in a two-speaker system according to an embodiment of the present invention.
Figure 4:
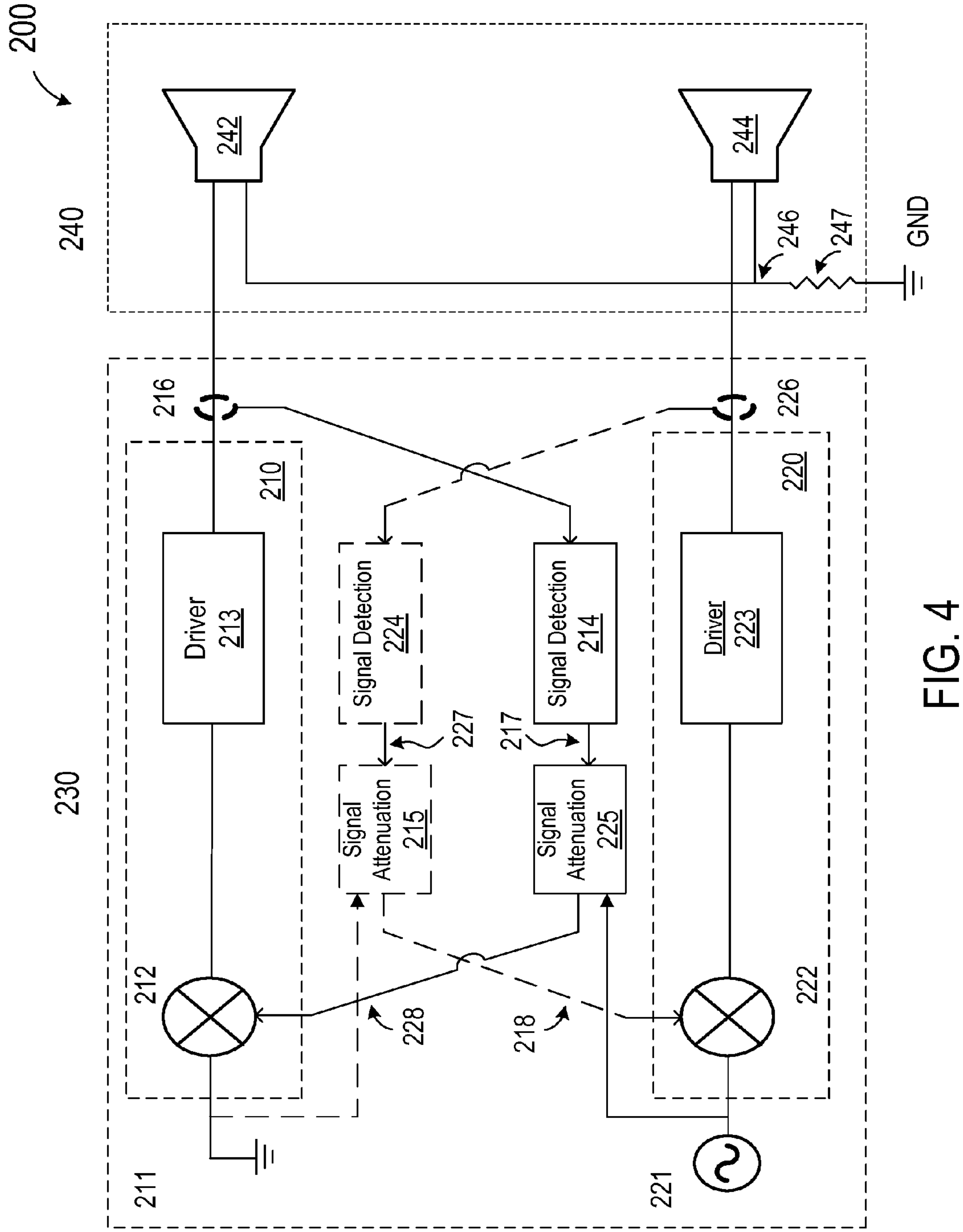

FIGS. 3 and 4 illustrate a method for reducing crosstalk in a two-speaker system according to an embodiment of the present invention. Similar to the audio system shown in FIG. 2, in FIG. 3, audio signal processing circuit 230 includes a first channel circuit 210 coupled to first speaker 242 and a second channel circuit 220 coupled to second speaker 244. The two speakers can represent two headphones in some applications. Audio signal processing circuit 230 is configured for driving a first speaker 242 and a second speaker 244. The first and the second speakers share a common ground terminal 246, which is coupled to an electrical ground through a resistor 247. Other components are the same as those in FIG. 2, and are not enumerated here.

In this embodiment, the method for reducing crosstalk in the two headphone system includes determining the operating parameters for the circuit blocks in audio signal processing circuit 230, for example, the signal attenuation circuits and the mixer circuits. First, one of the speakers, e.g., the first speaker 242, is driven by a (non-zero) signal input 211. The second speaker 244 receives an input of zero (no signal), as shown with input 221 connected to a ground. The output signal of the second driver 223, which has no input signal, is measured by signal detection circuit 224. This signal current represents the signal through the headphone with no direct input signal and, therefore, the crosstalk noise. The output signal 227 from signal detection circuit 224 is processed by signal attenuation circuit 215, which provides a feedforward signal 218 into the mixer circuit 222 of the non-active channel. The parameters of signal attenuation circuit 215 and mixer circuit 222 are adjusted until the detected output signal 227 becomes zero. In some embodiments, feedforward signal 218 includes a portion of the active channel input signal 211. For example, in an embodiment, feedforward signal 218 includes a fraction of the inverse of the input signal 211 to the first channel circuit 210. The parameters of signal attenuation circuit 215 and mixer circuit 222 for reaching zero detected output signal 227 are then determined for later use.

The same procedure is then performed on the other channel in order to eliminate crosstalk to the other channel, as shown in FIG. 4. FIG. 4 has similar components as FIG. 3, but with the feedforward path for channel two shown in broken lines, and a non-zero input signal 221 and a zero input signal 211. In this procedure, the parameters of signal attenuation circuit 225 and mixer circuit 212 are adjusted until the detected output signal 227 becomes zero. During the operation of the audio system, e.g., a headset, the parameters of signal attenuation circuit 215 and mixer circuit 222 for reaching zero detected output signals for both channels are used.

In FIGS. 3 and 4, the non-zero input signals, 211 or 221, are selected to be large enough, such that the crosstalk can be measured well above the noise level by the signal detection circuit. For example, if the signal to noise ratio is 90 dB and the output level is 0 dB and the crosstalk is −70 dB, then the energy of the crosstalk will be 20 dB higher than the noise energy, so it can easily be detected using the circuits described above. As another example, if the signal to noise ratio is 90 dB and the output level is −40 dB and the crosstalk is −70 dB, then the energy of the crosstalk will be 20 dB lower than the noise energy. In this case, special filtering techniques are used to detect the crosstalk.

Figure 5C:
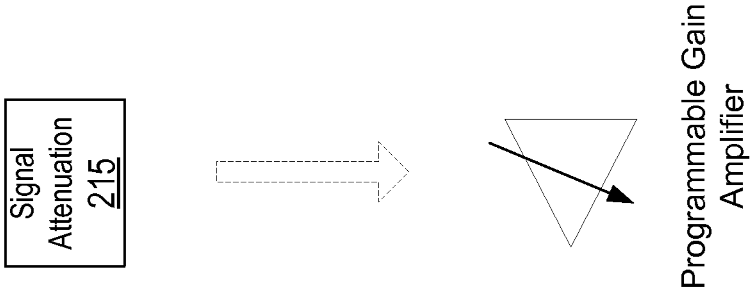
FIGS. 5A-5C illustrate possible implementations of the circuit blocks in FIGS. 2-4.
Figure 5B:
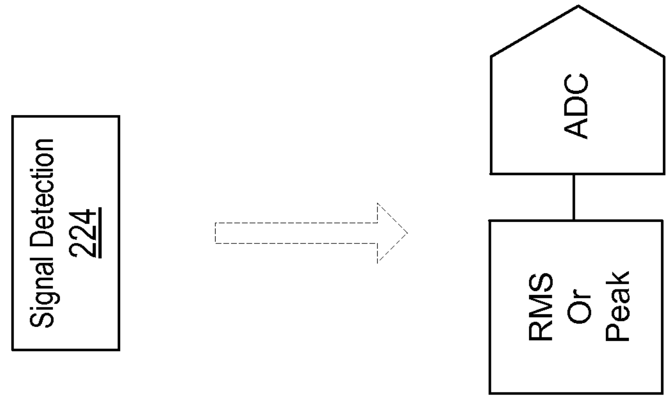
Figure 5A:
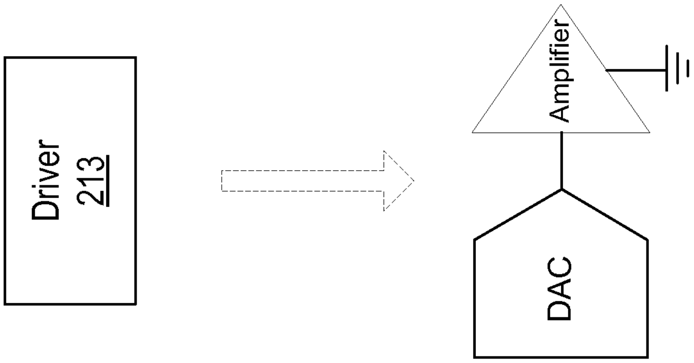

Depending on the embodiments, the circuits depicted in FIGS. 2-4 can be implemented using different circuit elements. FIGS. 5A-5C illustrate possible implementations of the circuit blocks in FIGS. 2-4. For example, each of the driver circuit can include a DAC (digital-to-analog converter) and an amplifier. Each of the signal detection circuits can include an ADC (analog-to-digital converter) and an RMS (root-mean-square) signal detector or peak signal detector. In specific embodiments, each of the signal detection circuits 214 and 224 may include a current detection circuit or a voltage detection circuit. For current detection, a current sensing resistor can be used. Examples of voltage detection methods are described below. Moreover, each of the signal attenuation circuit can include a programmable gain amplifier. In the methods described herein, circuit parameters such as the gain of the programmable gain amplifier and the scaling factors in the mixer circuits are adjusted to reduce the crosstalk noise. Of course, other known circuit techniques can also be used.

In embodiments in which DACs and ADCs are used as depicted in FIG. 5, then the PGA, signal detection, and mixer are designed digitally. Such designs are more predictable, smaller in area, and more accurate compared to analog implementations. In some embodiments, an analog solution can also be used, in which there would be no ADC and DAC, and the PGA, mixer and signal detection will be implemented by analog circuits.

Figure 6:
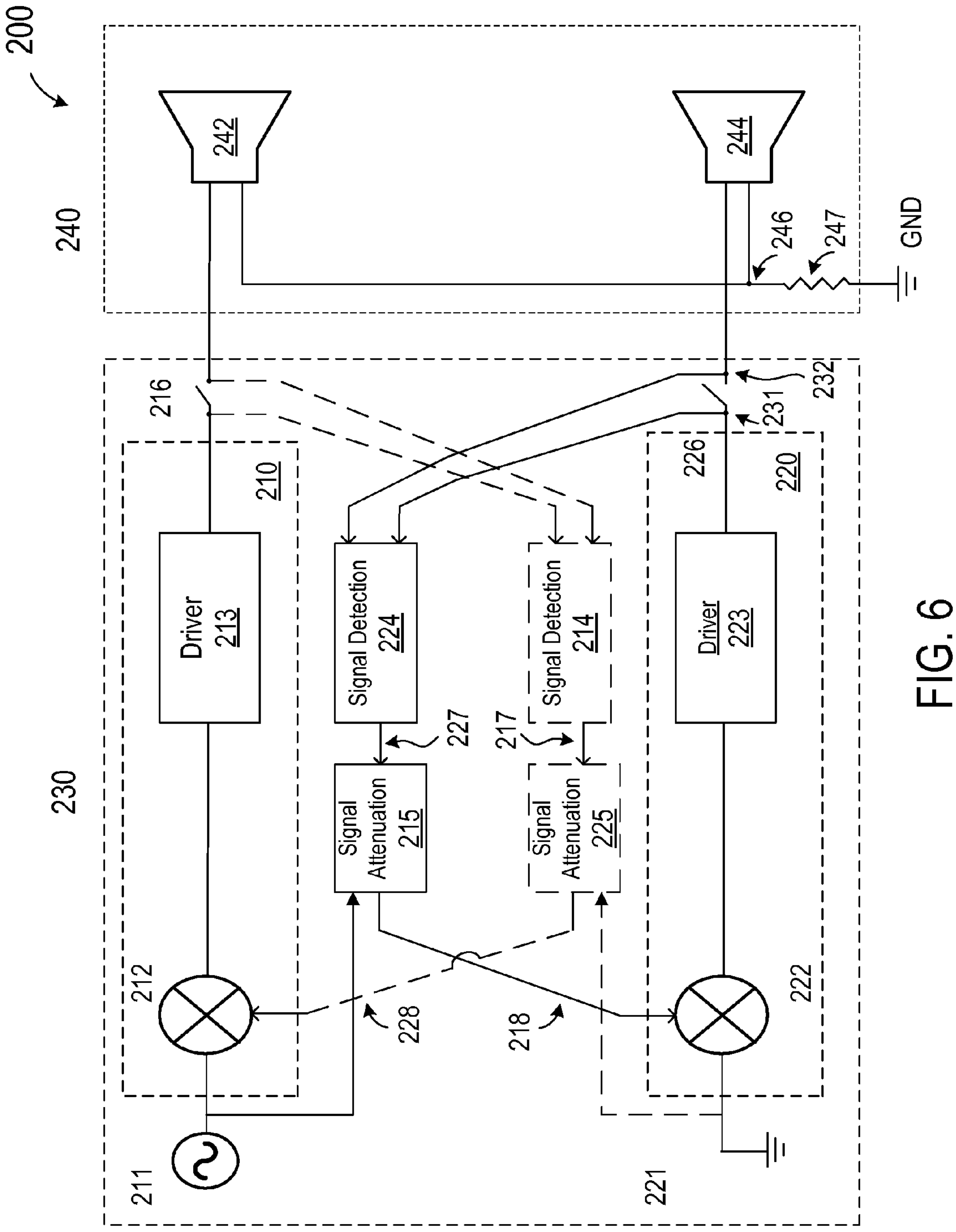
FIG. 6 illustrates a method for reducing crosstalk in a two-speaker system according to another embodiment of the present invention.

FIG. 6 illustrates a method for reducing crosstalk in a two-speaker system according to another embodiment of the present invention. Similar to FIG. 3, FIG. 6 shows audio signal processing circuit 230 includes a first channel circuit 210 coupled to first speaker 242 and a second channel circuit 220 coupled to second speaker 244. The first and the second speakers share a common ground terminal 246, which is coupled to an electrical ground through a resistor 247. The circuit blocks are similar to those in FIG. 3 and are not explained in detail here. In this method, the crosstalk signal is determined by applying an input signal to a first channel and grounding the input to the second channel, disconnecting the output of the second channel, and measuring the differential signal at two terminals 231 and 232 of the open output 226 of the second channel. As shown, terminal 232 is connected to speaker 244

As shown in FIG. 6, the first speaker 242 is driven by a (non-zero) signal input 211. The second speaker 244 receives an input of zero (no signal), as shown with input 221 connect to a ground. The output 226 of the second driver 223, which has no input signal, is disconnected, and the differential signal at both sides of the disconnected output 231 and 232 is measured by signal detection circuit 224. This signal represents the crosstalk noise. The output signal 227 from signal detection circuit 224 is processed by signal attenuation circuit 215, which provides a feedforward signal 218 into the mixer circuit 222 of the non-active channel. The parameters of signal attenuation circuit 215 and mixer circuit 222 are adjusted until the detected output signal 227 becomes zero. Feedforward signal 218 includes a portion of the active channel input signal 211. In some embodiments, feedforward signal 218 includes an inverse fraction of the input signal 211 to the first channel circuit 210. The parameters of signal attenuation circuit 215 and mixer circuit 222 for reaching zero detected output signal 227 are then determined and will be used during the operation of the headset. To measure the differential signal at two terminals 231 and 232 of the open output 226 of the second channel, signal detection circuit 224 can include, for example, a differential sensing amplifier.

The same procedure is then performed on the other channel in order to eliminate crosstalk noise at the other channel. In this procedure, the parameters of signal attenuation circuit 225 and mixer circuit 212 are adjusted until the detected output signal 227 becomes zero. To measure the differential signal at two terminals of the open output 216 of the first channel, signal detection circuit 214 can include, for example, a differential sensing amplifier, which can be implemented using known circuit techniques. During the operation of the headset, the parameters of both signal attenuation circuits and mixer circuits for reaching zero detected output signals are then used.

Figure 7:
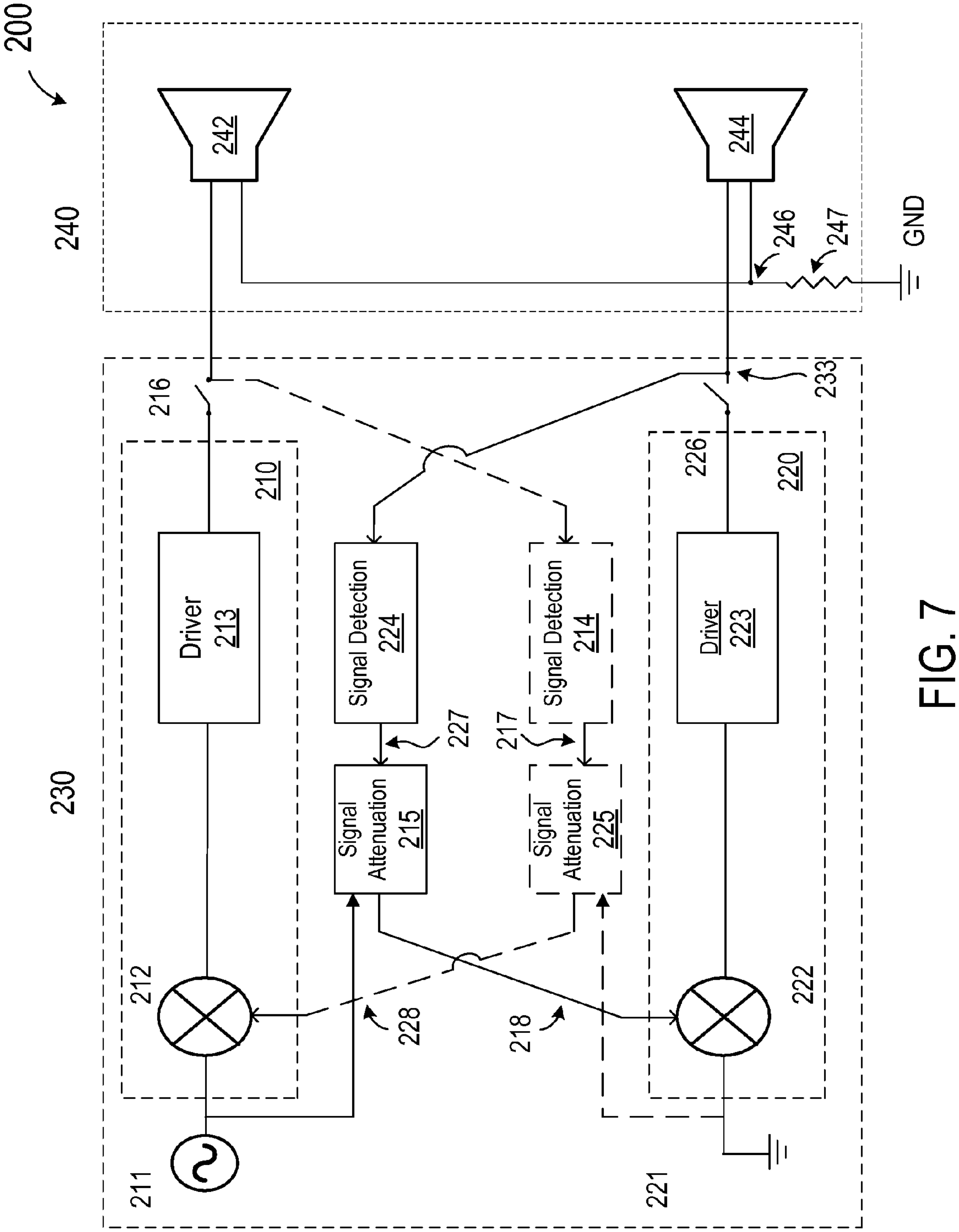
FIG. 7 illustrates a method for reducing crosstalk in a two-speaker audio system, such as a headset, according to yet another embodiment of the present invention.

FIG. 7 illustrates a method for reducing crosstalk in a two-speaker audio system, such as a headset, according to yet another embodiment of the present invention. Similar to FIGS. 3 and 6, FIG. 7 shows audio signal processing circuit 230 includes a first channel circuit 210 coupled to first speaker 242 and a second channel circuit 220 coupled to second speaker 244. The first and the second speakers share a common ground terminal 246, which is coupled to an electrical ground through a resistor 247. The circuit blocks are similar to those in FIGS. 3 and 7, and are not explained in detail here. In this method, the crosstalk signal is determined by applying an input signal to a first channel and grounding the input to the second channel, disconnecting the output of the second channel, and measuring the signal at the output of the second channel connected to the second speaker 244.

As shown in FIG. 7, the first speaker 242 is driven by a (non-zero) signal input 211. The second speaker 244 receives an input of zero (no signal), as shown with input 221 connect to a ground. The output 226 of the second driver 223, which has no input signal, is disconnected, and the signal at the speaker side of the disconnected output 233, which is at the input to the speaker 244, is measured by signal detection circuit 224. This signal represents the crosstalk noise. The output signal 227 from signal detection circuit 224 is processed by signal attenuation circuit 215, which provides a feedforward signal 218 into the mixer circuit 222 of the non-active channel. Circuit parameters, such as the parameters of signal attenuation circuit 215 and mixer circuit 222, are adjusted until the detected output signal 227 becomes zero. In some embodiments, feedforward signal 218 can include a portion of the active channel input signal 211. In some embodiments, feedforward signal 218 includes an inverse fraction of the 211, the input signal to the first channel circuit 210. The parameters of signal attenuation circuit 215 and mixer circuit 222 for reaching zero detected output signal 227 are then determined and will be used in the operation of the headset.

The same procedure is then performed on the other channel in order to eliminate crosstalk noise in the other channel. In this procedure, the parameters of signal attenuation circuit 225 and mixer circuit 212 are adjusted until the detected output signal 227 becomes zero. During the operation of the audio system, the parameters of both signal attenuation circuits and mixer circuits for reaching zero detected output signals are then used.

Figure 8:
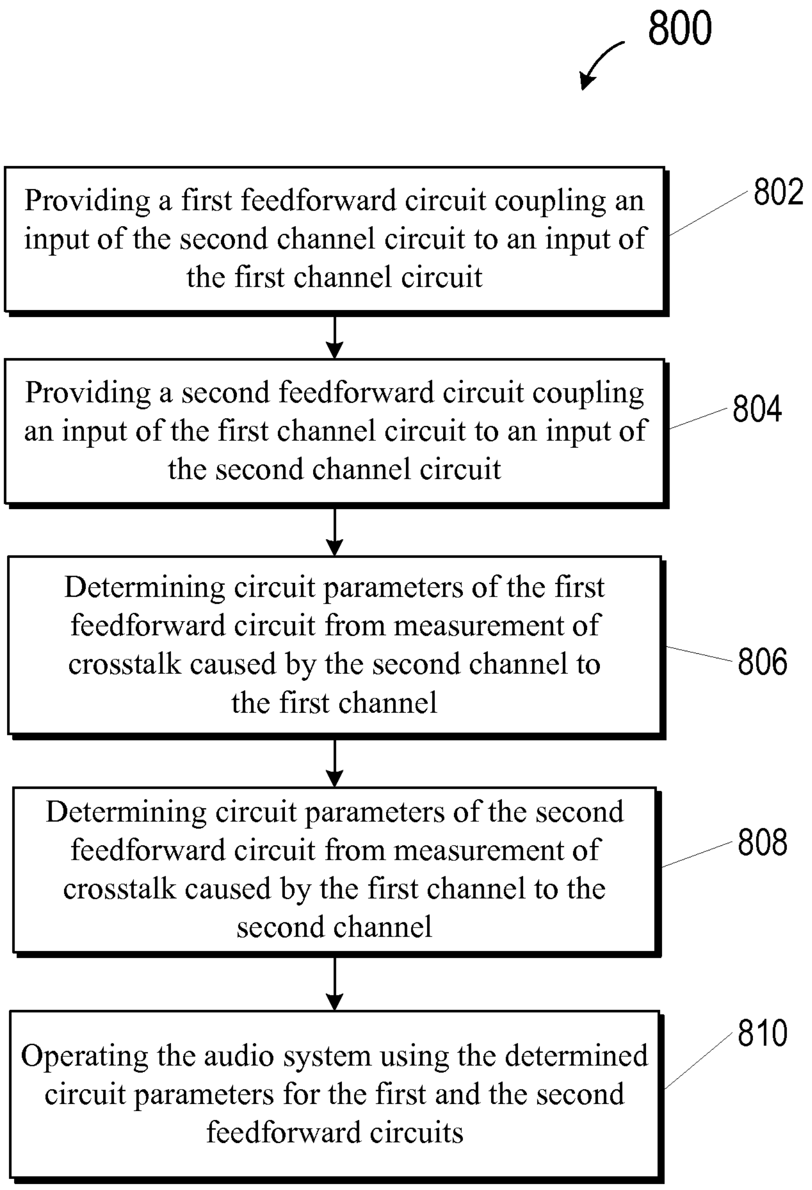
FIG. 8 is a flowchart illustrating a method for reducing crosstalk in a two-speaker audio system according to yet another embodiment of the present invention.

The various methods described above for reducing crosstalk noise in an audio system can be summarized in the flowchart in FIG. 8. The methods are for reducing crosstalk noise in an audio system having a first channel circuit for receiving a first input signal and driving a first speaker and a second channel circuit for receiving a second input signal and driving a second speaker. As shown in FIG. 8, method 800 includes, at step 802, providing a first feedforward circuit coupling an input of the second channel circuit to an input of the first channel circuit. At step 804, the method includes providing a second feedforward circuit coupling an input of the first channel circuit to an input of the second channel circuit. The method also includes, at step 806, determining circuit parameters of the first feedforward circuit from measurement of crosstalk caused by the second channel output to the first channel output. At step 808, the method includes determining circuit parameters of the second feedforward circuit from measurement of crosstalk caused by the first channel output to the second channel output. In a specific embodiments, the parameters are chosen such that a first detected output signal is zero when the first input signal is non-zero and the second input signal is zero, and such that a second detected output signal is zero when the second input signal is non-zero and the first input signal is zero. At step 810, the method includes operating the audio system using the determined circuit parameters for the first and the second feedforward circuits.

In the embodiments described above in connection to FIGS. 2-7, the first feedforward circuit includes signal detection circuit 214, signal attenuation circuit 225, and mixer 212. Similarly, the second feedforward circuit includes signal detection circuit 224, signal attenuation circuit 215, and mixer 222.

In an embodiment of the method, the first and the second speakers are connected to a common ground terminal. In another embodiment, each of the signal detection circuits includes a current detection circuit configured for detecting a current signal at the output of the respective channel circuit. In yet another embodiment, each of the signal detection circuit includes a voltage detection circuit configured for detecting a differential voltage signal at two terminals between a respective channel circuit and a respective speaker. In another embodiment, each of the signal detection circuit includes a voltage detection circuit configured for detecting a voltage signal at a terminal between the respective channel circuit and the respective speaker.

While the above is a description of specific embodiments of the invention, the above description should not be taken as limiting the scope of the invention. It is understood that the examples and embodiments described herein are for illustrative purposes only and that various modifications or changes in light thereof will be suggested to persons skilled in the art and are to be included within the spirit and purview of this application.

What is claimed is:

1. An integrated audio signal processing circuit for driving a first speaker and a second speaker, wherein the first and the second speakers share a common ground terminal, the integrated audio signal processing circuit comprising:

a first channel circuit for receiving a first input signal and driving the first speaker, the first channel circuit including a first mixer circuit coupled to a first driver circuit;

a second channel circuit for receiving a second input signal and driving the second speaker, the second channel circuit including a second mixer circuit coupled to a second driver circuit;

a first signal detection circuit coupled to an output of the first driver circuit and configured for providing a first detected output signal;

a second signal detection circuit coupled to an output of the second driver circuit and configured for providing a second detected output signal;

a first signal attenuation circuit coupled to the first input signal and configured for providing a first correction signal to the second mixer circuit based on the second detected output signal provided by the second signal detection circuit; and a second attenuation circuit coupled to the second input signal and configured for providing a second correction signal to the first mixer circuit based on the first detected output signal provided by the first signal detection circuit;

wherein the second signal attenuation circuit and the first mixer circuit are configured by:

applying a non-zero signal to the second speaker and a zero signal to the first speaker;

measuring the current to the first speaker; and adjusting the parameters for a first feedforward circuit until the current to the first speaker becomes zero;

wherein the first signal attenuation circuit and the second mixer circuit are configured by:

applying a non-zero signal to the first speaker and a zero signal to the second speaker;

measuring the current to the second speaker; and adjusting the parameters for a second feedforward circuit until the current to the second speaker becomes zero.

2. The circuit of claim 1, wherein each of the signal detection circuits includes a current detection circuit configured for detecting a current signal at the output of the first driver circuit and the output of the second driver circuit, respectively.

3. The circuit of claim 2, wherein each of the signal detection circuits includes a resistor coupled between the driver circuit and the speaker.

4. The circuit of claim 1, wherein each of the signal detection circuit includes a voltage detection circuit configured for detecting a differential voltage signal at two terminals between the respective driver circuit and the respective speaker.

5. The circuit of claim 1, wherein each of the signal detection circuit includes a voltage detection circuit configured for detecting a voltage signal at a terminal between the respective driver circuit and the respective speaker.

6. The circuit of claim 1, wherein:

each of the signal detection circuits comprises a current detection circuit, an ADC (analog-to-digital converter), and an RMS (root-mean-square) signal detector; and each of the signal attenuation circuits comprises a programmable gain amplifier.

7. The circuit of claim 1, wherein:

each of the driver circuits comprises a DAC (digital-to-analog converter) and an amplifier.

8. An audio system, comprising:

a first speaker and a second speaker, wherein the first and the second speakers share a common ground terminal that is coupled directly to an electrical ground through a resistor; and an integrated audio signal processing circuit for driving the first speaker and the second speaker, the integrated audio signal processing circuit including:

a first channel circuit for receiving a first input signal and driving the first speaker, the first channel circuit including a first mixer circuit coupled to a first driver circuit;

a second channel circuit for receiving a second input signal and driving the second speaker, the second channel circuit including a second mixer circuit coupled to a second driver circuit;

a first signal detection circuit coupled to an output of the first driver circuit and configured for providing a first detected output signal;

a second signal detection circuit coupled to an output of the second driver circuit and configured for providing a second detected output signal;

a first signal attenuation circuit coupled to the first input signal and configured for providing a first correction signal to the second mixer circuit based on the second detected output signal provided by the second signal detection circuit; and a second attenuation circuit coupled to the second input signal and configured for providing a second correction signal to the first mixer circuit based on the first detected output signal provided by the first signal detection circuit;

wherein each of the signal attenuation circuits comprises a programmable gain amplifier;

wherein the gain of each of the programmable gain amplifier and the scaling factor in each of the mixer circuit are configured to reduce crosstalk;

wherein the second signal attenuation circuit and the first mixer circuit are configured by:

applying a non-zero signal to the second speaker and a zero signal to the first speaker;

measuring the current to the first speaker; and adjusting the parameters for the second signal attenuation circuit and the first mixer circuit until the current to the first speaker becomes zero;

wherein the first signal attenuation circuit and the second mixer circuit are configured by:

applying a non-zero signal to the first speaker and a zero signal to the second speaker;

measuring the current to the second speaker; and adjusting the parameters for the first signal attenuation circuit and the second mixer circuit until the current to the second speaker becomes zero.

9. The audio system of claim 8, wherein each of the signal detection circuits includes a current detection circuit configured for detecting a current signal at the output of the first driver circuit and the output of the second driver circuit, respectively.

10. The audio system of claim 8, wherein each of the signal detection circuit includes a voltage detection circuit configured for detecting a differential voltage signal at two terminals between the respective driver circuit and the respective speaker.

11. The audio system of claim 8, wherein each of the signal detection circuit includes a voltage detection circuit configured for detecting a voltage signal at a terminal between the respective driver circuit and the respective speaker.

12. A method for reducing crosstalk noise in an audio system having a first channel circuit for receiving a first input signal and driving a first speaker and a second channel circuit for receiving a second input signal and driving a second speaker, the method comprising:

providing a first feedforward circuit coupling an input of the second channel circuit to an input of the first channel circuit;

providing a second feedforward circuit coupling an input of the first channel circuit to an input of the second channel circuit;

determining circuit parameters of the first feedforward circuit from measurement of crosstalk caused by a second channel output to a first channel output;

determining circuit parameters of the second feedforward circuit from measurement of crosstalk caused by the a first channel output to a second channel output; and operating the audio system using the determined circuit parameters for the first and the second feedforward circuits;

wherein determining circuit parameters for the first feedforward circuit comprises:

applying a non-zero signal to the second speaker and a zero signal to the first speaker;

measuring a current to the first speaker; and adjusting the parameters for the first feedforward circuit until the current to the first speaker becomes zero;

wherein determining circuit parameters for the second feedforward circuit comprises:

applying a non-zero signal to the first speaker and a zero signal to the second speaker;

measuring a current to the second speaker; and adjusting the parameters for the second feedforward circuit until the current to the second speaker becomes zero.

13. The method of claim 12, wherein the first and the second speakers are connected to a common ground terminal.

14. The method of claim 12, wherein each of the feedforward circuits comprises a mixer circuit, a signal detection circuit, and a signal attenuation circuit.

15. The method of claim 14, wherein each of the signal detection circuits includes a current detection circuit configured for detecting a current signal at the output of the respective channel circuit.

16. The method of claim 14, wherein each of the signal detection circuit includes a voltage detection circuit configured for detecting a differential voltage signal at two terminals between a respective channel circuit and a respective speaker.

17. The method of claim 14, wherein each of the signal detection circuit includes a voltage detection circuit configured for detecting a voltage signal at a terminal between the respective channel circuit and the respective speaker.

* * * * *